Figure 1:
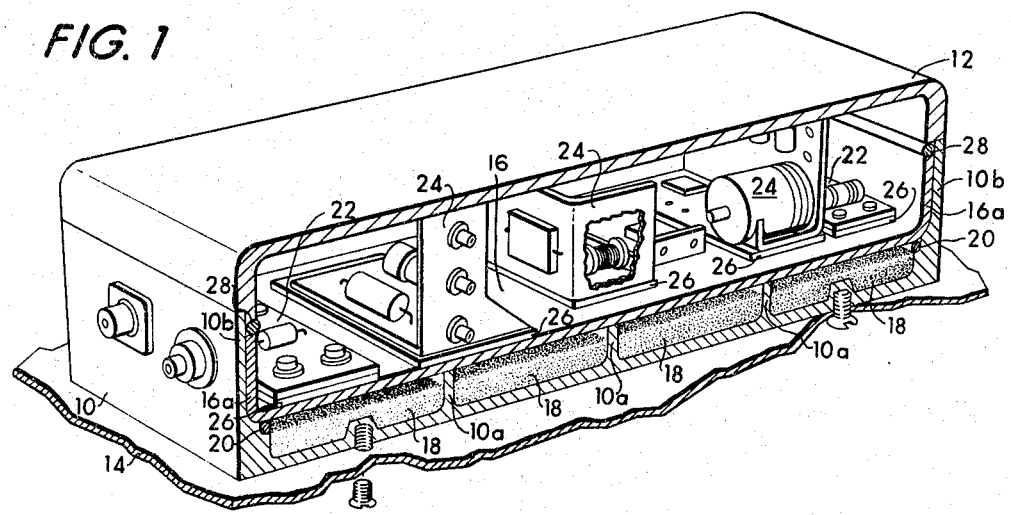

June 27, 1967 R. L. HAUMESSER ETAL 3,328,642
TEMPERATURE CONTROL MEANS UTILIZING A HEAT
RESERVOIR CONTAINING MELTABLE MATERIAL
Filed June 8, 1964

INVENTORS
ROBERT L. HAUMESSER
JOHN A. MEYER
BY

*Spencer E. Olson*

ATTORNEY

United States Patent Office 3,328,642
Patented June 27, 1967

3,328,642
TEMPERATURE CONTROL MEANS UTILIZING A HEAT RESERVOIR CONTAINING MELTABLE MATERIAL
Robert L. Haumesser, Cheektowaga, and John A. Meyer, Tonawanda, N.Y., assignors to Sylvania Electric Products Inc., a corporation of Delaware
Filed June 8, 1964, Ser. No. 373,374
2 Claims. (Cl. 317—100)

This invention relates generally to temperature control means for electronic equipment, and is particularly concerned with an extremely light weight structure capable of storing heat for extended periods of time while maintaining associated electronic component parts within reliable operating temperature limits.

Much of the electric power used to operate present-day electronic equipment is converted into unwanted heat. This results in an undesirable temperature rise in the equipment, the magnitude of which depends upon the amount of heat dissipated by the equipment to its environment. In ordinary electronic equipment, such as a television receiver, little special design effort is necessary to provide the requisite transfer of heat, since there is normally sufficient space around the tubes and other components of the chassis that adequate cooling is provided by natural convection of air over the assembly. In certain specialized electronic equipment, however, where space and weight are of prime importance, miniaturization is employed, resulting in much greater heat density and the attendant requirement of transferring the heat from the chassis. A good example is airborne electronic equipment where obviously economy of space and weight is very important. Electronic equipment for installation in subsonic aircraft has been designed with little emphasis on cooling, the equipment simply rejecting its heat to the surrounding air and to surrounding structure, depending on free convection, or in some cases, the cooling air being circulated at low velocities by small blowers. In most applications, this method of cooling was satisfactory since the ambient air temperature was low relative to the operating temperature of the equipment, or a source of cooling air could be made available through utilization of the blower.

With the advent of supersonic missiles, spacecraft, and other vehicles intended for flight beyond the earth's atmosphere, however, new problems are presented. The extreme environmental changes during the various phases of a space vehicles flight path from take-off to landing pose many complex thermodynamic problems; in addition, the volume and weight of a space craft are severely limited. Consequently, conventional cooling systems are inadequate for space applications, and the bulk and weight of conventional heat sinks and cooling air systems render them impractical for such applications. During initial upward flight, the speed of the space vehicle is not great enough to pose any serious thermal problems. While the vehicle is in orbit high above the earth's atmosphere, the absolute pressure is almost zero and resistance to the forward flight of the vehicle is almost nil; hence, no serious thermal problems are presented during this phase of the flight path either. In descending toward earth, however, the vehicle accelerates and attains extremely high speeds until reentry of the earth's atmosphere, whereupon air friction tends to slow the vehicle. During this reduction of velocity in atmospheric entry, the kinetic energy of the vehicle is converted into thermal energy in the surrounding gas; some of this thermal energy is transferred to the surface of the vehicle causing extreme surface temperatures.

To date, a combination of cold plating and radiation have been successfully employed to provide cooling during the flight prior to atmospheric entry. That is, the heat generating systems within the vehicle are cold plated to the outer surface, and radiation transfer between the vehicle skin and outer space results in maintaining desired temperatures. During the atmospheric entry phase of the flight path, however, this radiant cooling mechanism is inadequate. Heat generated from hot electronic components packaged within the vehicle is not able to flow to a cooler skin, since the skin may be as hot as the components. Thus, in order for electronic components to survive atmospheric entry, some means must be provided to maintain reliable component part temperatures while the equipment is operating for extended periods without external cooling. Moreover, the temperature control means must be practical, and not materially increase the weight or volume of the electronic package.

With an appreciation of the shortcomings of available cooling systems and the problems attendant the cooling of specialized electronic equipment, applicants have as a prime object of this invention to provide temperature control means for electronic equipment which is capable of maintaining associated electronic component parts within reliable operating temperature limits for extended periods of time without materially adding to the weight or volume of the equipment.

Another object of the present invention is to provide temperature control means for electronic equipment operating in a space vehicle which is capable of maintaining associated electronic component parts within reliable operating temperature limits during flight beyond the earth's atmosphere and during the flight period from reentry of the earth's atmosphere to landing.

Another object of the invention is to provide a temperature control structure for removably mounted electronic components which minimizes package weight and maximizes the operating time period that the electronic components may be maintained within temperature limits that afford reliable operation.

Another object of the invention is to provide an electronic equipment package of minimum weight and volume capable of maintaining equipment temperatures within reliable operating limits for a given period of time.

Another object is to provide an extremely light weight structure capable of storing heat for extended periods of time while maintaining associated electronic component parts within reliable operating temperature limits.

Briefly, the foregoing objects are achieved by a packaging structure for electronic components which includes a heat reservoir of extremely light weight and high overall specific heat capacity. These unique heat sink characteristics are attained by combining the high specific heat of light weight structural metals, such as beryllium and aluminum, and the high specific heat, high heat of fusion, and light weight of certain substances, such as sodium. In a preferred embodiment of the invention, the electrical components to be temperature controlled are removably mounted on a thermal conducting dielectric mounting base such as beryllium oxide. The mounting base is secured to a beryllium heat sink formed to have sealed cavities therein, the cavities being partially filled with a core material. Sodium is selected as the core material because, in addition to the aforementioned characteristic, it has a melting point below the maximum allowable operating temperature of the electronic components. Hence, the sodium will absorb a large amount of heat in melting at a fixed temperature within the allowable operating range. The combination of the light weight and high specific heat of heat sink materials and the high heat of fusion of the core material enables the heat reservoir to absorb a large amount of heat per unit weight with a relatively small temperature rise, thereby enabling the maintenance of reliable component operating temperatures for prolonged periods of time with a structure of minimum size and weight.

Figure 2:
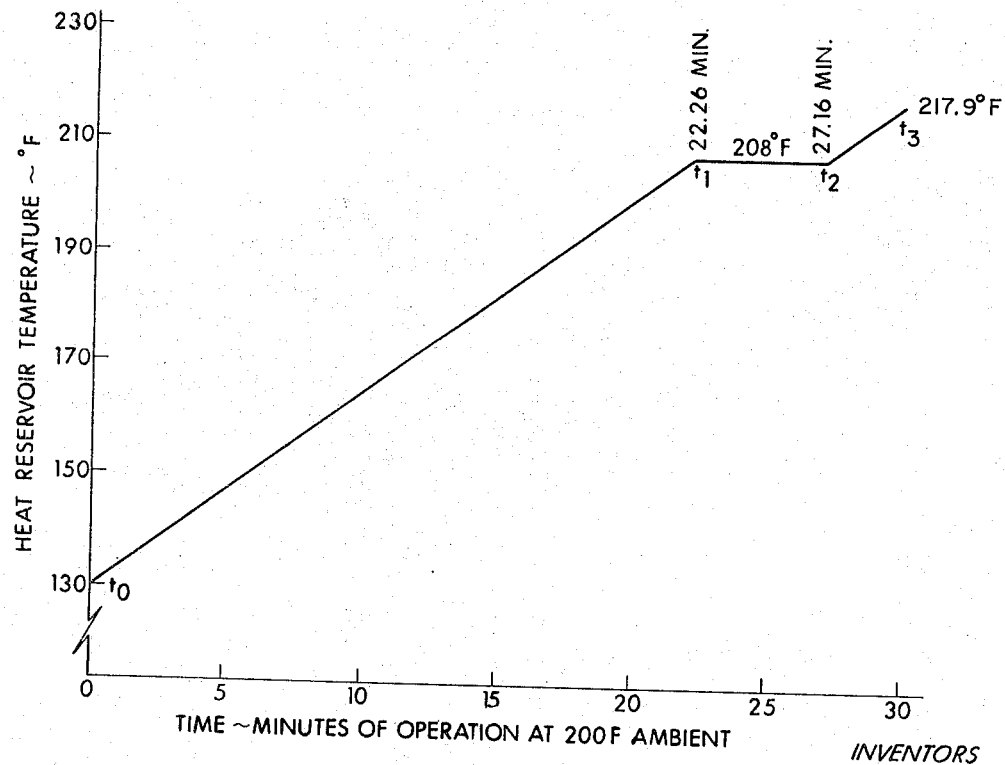

Other objects, features and advantages of the invention, and a better understanding of its construction and operation will be apparent from the following detailed description taken in connection with the accompanying drawings, in which:

FIG. 1 is a perspective view, partially cut away, of an electronic equipment package embodying the principles of the invention; and FIG. 2 is a graph showing the relationship of temperature rise vs. time for the heat reservoir of an electronic equipment package embodying the present invention.

To enable a full understanding of the construction and operation of the invention, a brief analysis of the parameters involved will be presented. The following basic heat balance equation applies to any heat transfer process:

$$Q_{in} - Q_{loss} - Q_{stored} = 0$$

The following terms will be employed in this analysis:

$U$ = Overall heat transfer coefficient (B.t.u./hr./ft.$^2$/° F.),
$A$ = Total heat transfer area (ft.$^2$),
$W$ = Total weight of the equipment (lbs.),
$t$ = Time (hrs.),
$t_o$ = Time at $t=0$, starting point of a time period,
$t_1$ = Time at some $t > t_o$ (hrs.),
$C_{p_{eq}}$ = Equivalent specific heat of the equipment (B.t.u./lb./° F.); i.e., the quantity of heat required to raise the temperature of a pound mass of the overall equipment by one degree Fahrenheit.
$Q$ = Power dissipation of the equipment (B.t.u./hr.),
$T$ = Equipment temperature (° F.),
$T_a$ = Ambient temperature at $t_o$ (° F.),
$T_1$ = Equipment temperature at $t_1$ (° F.), and
$\epsilon = 2.7183$ (base of natural logarithms).

For purposes of this invention, $Q_{in}$ = Electrical power dissipation (B.t.u.) = $Qdt$.
$Q_{loss}$ = Total heat transferred from the equipment by a combination of radiation, convection and conduction (B.t.u.) = $UA(T-Ta)dt$, and
$Q_{stored}$ = Total heat stored in the equipment by components (transistors, resistors, capacitors, etc.), hardware, structure, etc. (B.t.u.) = $WC_{p_{eq}}dT$.

Then $$Qdt - UA(T-Ta)dt - WC_{p_{eq}}dT = 0$$

Transposing terms, we obtain $$\frac{dt}{WC_{p_{eq}}} = \frac{dT}{Q - UA(T-Ta)}$$

Now, integrating between the limits of 0 and 1, we get $$(t_1 - t_o)\frac{UA}{WC_{p_{eq}}} = \ln\left[\frac{Q}{Q - UA(T_1 - T_a)}\right]$$

or $$\frac{UA}{\epsilon WC_{p_{ep}}}(t_1 - t_o) = \frac{Q}{Q - UA(T_1 - T_a)} \quad (1)$$

If the $Q_{loss}$ term is neglected, then $$Qdt = WC_{p_{eq}}dT$$

and $$Q(t_1 - t_o) = WC_{p_{eq}}(T_1 - T_a) \quad (2)$$

The assumptions made in the above calculations include:

(1) $C_{p_{eq}}$ and $U$ are not temperature variant within the range under consideration;
(2) The analysis is one dimensional; i.e., heat flow and temperature gradient vary in one direction only; and
(3) Equipment temperature at time $t_o$ is equal to the ambient temperature, $T_a$.

From Equations 1 and 2 it will be observed that for a given time period $(t_1 - t_o)$ and power dissipation $Q$, the equipment temperature $T_1$ may be reduced by increasing the product $WC_{p_{eq}}$. For space vehicle application, however, there also is a requirement to keep the total equipment weight ($W$) as low as possible, since rocket thrust is limited. Hence, the only way to increase this product while minimizing equipment weight is to increase the equivalent specific heat ($C_{p_{eq}}$) of the equipment.

Materials are available for structural and heat sink purposes that exhibit the property of a high specific heat, but as will become evident, the resulting equipment weight is higher than it need be. Substances are also available, however, that change phase at temperatures less than the maximum allowable equipment temperatures. The electronic equipment packaging concept in accordance with the present invention effectively increases equivalent specific heat and minimizes package weight by combining the high specific heat of structural metals having a low specific gravity, such as beryllium or aluminum, and the high heat of fusion of substances such as sodium and lithium, which have a high specific heat, low specific gravity, and a melting point below the maximum allowable equipment temperature. The result is a heat reservoir for electronic component parts which minimizes package weight and volume, while still maintaining equipment temperatures ($T_1$) within the reliable operating range of the electronic components.

Referring now to FIG. 1, the temperature control techniques in accordance with this invention are shown embodied in an electronic equipment package designed for use in a space vehicle. The enclosure for the electronic component chassis comprises a base section 10 and a cover section 12 fastened to the base section by suitable means. By way of example, both sections of the enclosure are formed from 0.062 inch thick beryllium stock and serves as a heat sink as well as a structural member. The base section 10, which constitutes the main heat sink is rigidly secured to a suitable cold plate 14 in the vehicle in a manner to minimize the thermal resistance across the interface. Cold plate 14 may comprise the vehicle casing, with the electronic equipment attached to the interior surface, the exterior surface being the outer skin of the vehicle.

Base section 10 is formed with a number of ribs 10a extending transversely of the long dimension of the structure, and its sidewalls have recessed portions 10b shaped to receive a beryllium plate 16 having mating end portions 16a. The cavities defined by the plate 16, the base plate and ribs 10a are partially filled with a core material 18 having a melting temperature below the maximum reliable operating temperature of the electronic components, and also having a high heat of fusion, a high specific heat, and a low specific gravity. In addition, it is desirable that the core material not react with the metal of base section 10 and plate 16; otherwise, a barrier coating must be employed. In the preferred embodiment being described, sodium was chosen as the core substance. Other suitable core substances include lithium, potassium, magnesium chloride, magnesium nitrate, calcium nitrate, cupric nitrate, manganese nitrate, nickel nitrate, sodium phosphate, sodium sulfate, zinc nitrate, and a number of organic compounds such as pyrocatechol, glutaric acid, lauric acid, methyl fumarate, naphthalene, naphthol, m-nitroaniline, palmitic acid, quinone, resorcinol, stearic acid, tristearin, urethane, and beeswax. Each of the above listed core substances has a specific gravity less than 2.1, a specific heat greater than 0.17 cal./gm./° C., a heat of fusion greater than 15 cal./gm., and a melting point which falls within the range from 24.4° C. to 116.7° C. (76° F. to 242° F.); the structural metal beryllium has a specific gravity of 1.8 and a specific heat of 0.45 cal./gm./° C.; and, aluminum has a specific gravity of 2.7 and a specific heat of 0.23 cal./gm./° C. (ref. Handbook of Chemistry and Physics, Hodgman, Chemical Rubber Publishing Co., Cleveland, Ohio).

The assembly of plate 16 to base 10 retains core substance 18 in the base section cavities. Preferably the plate and base are designed to provide a press fit between plate portions 16a and base portions 10b whereby the substance 18 is sealed in the cavities. However, a gasket type seal 20 may also be employed at the plate-base cavity joints to effect the desired seal. Since the base cavities are sealed, a space just sufficient to provide room for thermal expansion of substance 18 in transforming to the liquid state is allowed in each cavity.

The electrical circuitry and components are assembled on separate modules comprising printed circuit boards 22 and aluminum sub-chassis 24 which are, in turn, supported on plate 16. The modules are rigidly fastened to the plate 16 with a dielectric thermal conductor 26, such as a sheet of beryllium oxide, serving as a mounting base for each circuit module and electrically insulating the circuits from the plate 16. Since the electronic components are mounted externally of the heat sink, the components may be removably assembled to the modules by well known methods which provide an efficient heat exchange relation with the support structure. That is, the component mounts must be selected and arranged to provide adequate thermal conductance paths from the components to thermal conductor 26. In this manner the components may be conveniently removed or replaced, whenever the need arises, merely by disassembling cover 12. The module layout and assembly is such as to provide the most desirable thermal paths for the more heat sensitive components. The overall assembly is arranged to provide excellent heat conductance properties from the heat generating components through the beryllium oxide sheets 26 to the plate 16. To enable adequate thermal conductance paths to cold-plate 14, the material of plate 16 and base 10 is also selected from metals having a relatively high thermal conductivity and a large surface area of base 10 must meet plate 16 in a uniformly tight interface to minimize the thermal resistance thereacross. The press fit of plate 16 to base portions 10b and the tops of ribs 10a insure this efficient thermal transfer in addition to providing a seal for the core material. The ribs 10a provide a two-fold function, therefore, of strengthening the cored structural support means for the electronic chassis and providing heat conductance paths to the cold plate 14.

The enclosure of the electronic chassis is completed by the assembly of cover section 12, the periphery of which forms a joint with the peripheral edges of base 10 and plate 16. Since the space vehicle equipment is pressurized, an environmental, O-ring type seal 28 is employed along the common cover joint of the base, plate and cover sections.

While solid equipment cases can be made with adequate thermal capacity, utilization of the heat of fusion of sodium results in a significant reduction in weight. Some representative values of weight required with various cases to provide adequate heat sinking are indicated in Table I.

TABLE I.—WEIGHT OF VARIOUS CASE CONFIGURATIONS TO PROVIDE ADEQUATE HEAT SINKING CAPACITY

| Case Material | Outside Dimensions, inches | Wall Thickness, inches | Total Case Weight, lb. |
| --- | --- | --- | --- |
| Beryllium | 4 x 6 x 1⅛ | .08 wall<br>.097 base | 0.515 |
| Aluminium and Sodium | 4 x 6 x 1⅛ | .06 | 0.619 |
|  | 4 x 4 x 1⁷⁄₁₆ | .06 | 0.528 |
| Beryllium and Sodium | 4 x 4 x 1⁷⁄₁₆ | .06 | 0.346 |
|  | 3¾ x 5½ x 1⁷⁄₁₆ | .06 | 0.326 |

When the space vehicle is in orbit high above the earth's atmosphere, electronic equipment temperature is controlled by conduction of the heat generated by the operating electronic components through to the vehicle cold plate 14. This is possible since during flight at this altitude the skin of the vehicle will be relatively cool. To demonstrate the effectiveness of this heat transfer process for the FIG. 1 packaging embodiment, the following steady state (orbit) calculation is presented.

Because of the necessity of a space within the sodium chamber to allow for expansion, the conductance of the sodium will be neglected and the heat transfer through the beryllium side walls only will be considered. Any conductance through the sodium chamber will then result in a lower temperature drop, making a more conservative and reliable design.

$$Q = \frac{KA}{X} \Delta T$$

Where $Q$ = Heat input (53.2 B.t.u./hr.)
$K$ = Thermal conductivity of beryllium (87 B.t.u./hr.—ft.²—F./ft.)
$A$ = Heat transfer area (0.00729 ft.²)
$X$ = Length of conducting path (0.00896 ft.)
$\Delta T$ = Temperature drop from chassis mounting surface of plate 16 to heat sink 14 (° F.), Then $$\Delta T = \frac{QX}{KA} = \frac{(53.2)(.00896)}{(87)(.00729)} = 0.752° \text{ F.}$$

The temperature of the chassis mounting surface of plate 16 will therefore be less than 1° F. above the temperature of the equipment mounting surface of cold plate 14.

During the period of flight from reentry of the earth's atmosphere to landing (assumed to be 30 minutes or less), air friction will cause the vehicle skin to become extremely hot, so hot that the heat generated by the operating electronic components cannot be conducted away through the cold plate. Temperature control must be provided by the capability of the electronic component supporting structure to act as a high capacity heat reservoir for the required 30 minute period. The following simplified analysis is provided, with reference to the temperature vs. time graph of FIG. 2, to illustrate this temperature control process for the FIG. 1 packaging embodiment.

The following assumptions are made for this analysis:

(1) Initial heat reservoir temperature just prior to atmospheric entry is 130° F.,
(2) Outer dimensions of equipment package are 3¼ x 5½ x 1⁷⁄₁₆ inches,
(3) Wall thickness is ¹⁄₁₆ inch,
(4) Inner volume for component section is 3⅛ x 5⅜ x 1 inches,
(5) Beryllium volume is 3.56 cubic inches,
(6) Beryllium weight is 0.238 pound,
(7) Sodium volume is 2.51 cubic inches,
(8) Sodium weight is 0.0878 pound,
(9) Ambient temperature after atmospheric entry is 200° F. with no cooling, and
(10) Maximum allowable reservoir temperature is 230° F. This limit is illustrative and may be higher or lower, depending upon the type of components to be temperature controlled.

Due to the high vehicle skin temperature during reentry, the $Q_{loss}$ term can be neglected, and heat balance Equation 2 applies. It is repeated below for convenience.

$$Q(t_1 - t_0) = WC_{p_{eq}}(T_1 - T_a)$$

From initial conditions to 208° F., the melting point of sodium, heat reservoir temperature will rise in a linear manner as shown in FIG. 2. The time period $(t_1 - t_0)$ for this portion of the heat storage process is 22.26 minutes and is determined as follows:

$$\frac{Q \Delta t}{60} = W_{Be} C_{Be} \Delta T_{Be} + W_c C_c \Delta T_c + W_s C_s \Delta T_s + W_{al} C_{al} T_{al}$$

Where
$Q$ = Heat input (15 watts) or (53.2 B.t.u./hr.),
$\Delta t$ = Time period $t_1 - t_0$ (minutes),
$W_{Be}$ = Weight of beryllium (0.238 lb.),
$C_{Be}$ = Specific heat of beryllium (0.45 B.t.u./lb.—° F.),
$W_c$ = Weight of electrical parts absorbing heat (0.5 lb.),
$C_c$ = Equivalent specific heat of electrical parts (0.175 B.t.u./lb.—° F.),
$W_s$ = Weight of sodium (0.0878 lb.),
$C_s$ = Specific heat of sodium (0.295 B.t.u./lb.—° F.),
$W_{al}$ = Weight of aluminum heat sink (0.143 lb.),
$\Delta T$ = Temperature rise above initial temperature (130° F.) = $(T-130)$,
$T$ = Temperature of heat reservoir (° F.),
$C_{al}$ = Specific heat of aluminum (0.23 B.t.u./lb.—° F.),
Then $$\frac{53.2\Delta t}{60} = (t-130)(0.2534)$$

$$\Delta t = 0.2856T - 37.14$$

or $$T = 3.5\Delta t + 130$$

Hence for $T = 208°$ F., $\Delta t = 22.26$ minutes. At 208° F., the temperature remains constant for a period of 4.9 minutes $(t_2 - t_1)$ while the sodium changes from the solid state to the liquid state.

$$Q\Delta t = W_s Q_{fs}$$

Where
$Q_{fs}$ = Heat of fusion of sodium (49.5 B.t.u./lb.), and
$\Delta t$ = time period
$t_2 - t_1$ (minutes)
Then $$\frac{53.2}{60}\Delta t = (0.0878)(49.5) = 4.35$$

And $$\Delta t = 4.9 \text{ minutes}$$

Above 208° F., the heat reservoir temperature rises with the same slope as before reaching the melting point of sodium.

$$T = 3.5\Delta t + 208$$

Where $\Delta t$ = time period $t_3 - t_2$ (minutes)

Thus, as shown in FIG. 2, the heat reservoir temperature rises linearly for 22.26 minutes to 208° F., remains constant at 208° F. for 4.9 minutes, then rises linearly to 217.9° F. at the end of the 30 minute period. The 12° temperature difference between the 218° F. calculated end point and the 230° F. maximum allowable reservoir temperature is more than sufficient to allow for thermal resistance of leads, brackets and mounting interfaces.

To summarize, a light weight heat reservoir for electronic components has been provided which is capable of absorbing heat, without external cooling, for extended periods of time, while maintaining a desired temperature control. As shown, this reservoir can be integrated into the electronic equipment case, with a large number of components assembled thereto in a conveniently removable fashion. The heat reservoir essentially comprises a cored metal heat sink having the cores partially filled with a low melting point substance having a high latent heat of fusion. The characteristics of the core substance enable it to absorb a large amount of heat per unit weight with a relatively small temperature rise. During operation, heat from the electronic components is conducted through the heat sink metal structure to the core substance, which melts when a sufficient amount of heat is absorbed. If the application is such that the heat source is removed after a given time period, the core material will resolidify and slowly dissipate the absorbed heat, which will be conducted to the cold plate. Less core material than solid metal heat sink is required for an equivalent degree of temperature control. Hence, the technique provides a reduction in weight over a light weight solid case having the same thermal capacity. By combining the high specific heat of light weight structural metals such as beryllium and aluminum, and the high heat of fusion, high specific heat, and light weight of low melting point substances such as sodium and lithium, considerable weight is saved, while still maintaining reliable equipment temperatures. The above mentioned characteristics of the heat reservoir, together with the high thermal conductivity of the heat sink thermal paths, enable active and passive electronic components in a space vehicle to be kept to reliable operating temperature limits during both orbit and reentry.

Although the invention has been described as having particular applicability to temperature control of space-borne electronic equipment, it is equally useful in other high temperature environments where the availability of cooling air is unavailable or at a premium. An example is portable electronic communication gear which must be light enough to enable one man to conveniently carry it, yet be capable of absorbing the generated heat for extended time periods without external cooling. The concept might also be employed in the packaging of well-logging equipment, high temperatures being encountered in deep wells and the problem of supplying cooling air very difficult, or in the packaging and temperature control of electronic equipment installed in deep mines. Also, the system might be used to provide temperature control for equipment mounted near, or conceivably within a furnace, where it is necessary to thermally insulate the electronic parts from the ambient.

While particular embodiments of the invention have been shown, it is to be understood that applicants do not wish to be limited thereto since many modifications can now be made by ones skilled in the art. For example, as previously mentioned, several substances are suitable for use as the core material, as well as more than one structural metal being applicable. Magnesium, which has a specific gravity of 1.7 and a specific heat of 0.25 cal./gm./° C. may also be used for the material of base 10 and plate 16, provided the metal is adequately protected from the core material. Also there may be infinite variations of the heat reservoir configuration; it may be disposed about the component, between components, enclose components, or resemble the structure of FIG. 1. The applicants, therefore, contemplate by the appended claims to cover all such modifications as fall within the true spirit and scope of their invention.

What is claimed is:

1. For a vehicle intended for flight beyond the earth's atmosphere and having a casing with interior and exterior surfaces, wherein the exterior surface of said casing is the exterior surface of said vehicle, an electronic equipment package comprising, in combination, a first structural member secured to the interior surface of said casing in efficient heat transferring relationship therewith, said first structural member having cavities formed therein, a solid substance having a specific gravity less than 2.1, specific heat greater than a 17 cal./gm./° C. and heat of fusion greater than 15 cal./gm. partially filling the cavities of said first structural member, a second structural member aranged to retain said substance within and to seal said cavities, a dielectric thermal conductor secured to the surface of said second structural member in a manner to minimize the thermal resistance across the interface therebetween, electronic components assembled in thermal contact with said dielectric thermal conductor, and a third structural member assembled to said first and second structural members for completing the encasement of said electronic components, said substance having a melting point below the maximum allowable operating temperature of said electronic components and said first, second and third structural members being formed of a material having a specific gravity less than 2.8 and a specific heat greater than 0.22 cal./gm./° C., thereby minimizing the weight of said package and whereby the heat generated by the operation of said electronic components is efficiently conducted to said vehicle casing during flight beyond the earth's atmosphere and said structural members and said substance provide sufficient heat capacity during the flight period from reentry of the earth's atmosphere to landing for maintaining said operating electronic components within reliable operating temperature limits.

2. An electronic equipment package comprising, in combination, a first structural member having cavities formed therein, a solid substance having a specific gravity less than 2.1, specific heat greater than 0.17 cal./gm./° C. and heat of fusion greater than 15 cal./gm. partially filling the cavities of said first structural member, a second structural member arranged to retain said substance within and to seal said cavities, a dielectric thermal conductor secured to the surface of said second structural member in a manner to minimize the thermal resistance across the interface therebetween, electronic components assembled in thermal contact with said dielectric thermal conductor, and a third structural member assembled to said first and second structural members for completing the encasement of said electronic components, said substance having a melting point below the maximum allowable operating temperature of said electronic components, and said first, second and third structural members being formed of a material having a specific gravity less than 2.8 and a specific heat greater than 0.22 cal./gm./° C., thereby minimizing the weight of said package and maximizing the heat capacity of said package over the reliable operating temperature range of said electronic components.

References Cited

UNITED STATES PATENTS

| 2,883,591 | 4/1959 | Camp | 317—100 X |
| 2,936,741 | 5/1960 | Telkes. | |
| 3,196,317 | 7/1965 | Potter et al. | 317—100 |

FOREIGN PATENTS 1,054,473  4/1959  Germany.

ROBERT K. SCHAEFER, *Primary Examiner.*

W. C. GARVERT, D. SMITH, *Assistant Examiners.*